United States Patent

Setogawa et al.

[11] Patent Number: 5,822,024
[45] Date of Patent: Oct. 13, 1998

[54] IMAGE DATA PROCESSING METHOD AND APPARATUS OF SAME

[75] Inventors: Toshiaki Setogawa; Kazuyasu Imahashi; Kenji Mori; Kentaro Tanaka, all of Kanagawa, Japan

[73] Assignee: Sony Corporation, Tokyo, Japan

[21] Appl. No.: 806,211

[22] Filed: Feb. 26, 1997

[30] Foreign Application Priority Data

Feb. 29, 1996 [JP] Japan .................................. 8-042980

[51] Int. Cl.$^6$ .................................................. H04N 1/26
[52] U.S. Cl. .................. 348/845; 348/700; 386/4; 386/52
[58] Field of Search .................................. 348/845, 700, 348/419, 415, 404; 386/4, 52; H04N 7/26

[56] References Cited

U.S. PATENT DOCUMENTS

| | | | |
|---|---|---|---|
| 5,132,792 | 7/1992 | Yonemitsu | 348/416 |
| 5,231,484 | 7/1993 | Gonzales | 348/700 |
| 5,508,750 | 4/1996 | Hewlett | 348/700 |
| 5,617,150 | 4/1997 | Nam | 348/700 |

*Primary Examiner*—Howard Britton
*Attorney, Agent, or Firm*—Frommer Lawrence Haug LLP; William S. Frommer

[57] ABSTRACT

An image data processing method in a signal processing method for coding a picture sequence comprised of I-pictures, P-pictures, and B-pictures accommodated in GOP's, wherein when the pictures of a certain GOP among a series of GOP's are changed, the coding is performed replacing the first picture of the sequence of the changed pictures of the GOP with an I-picture of a picture number prescribed in accordance with the position of change so that coding is possible without existence of a picture in the preceding GOP.

6 Claims, 14 Drawing Sheets

IMAGE DATA PROCESSING METHOD AND APPARATUS OF SAME

BACKGROUND OF THE INVENTION

1. Field of the Invention

The present invention relates to an image coding method and an apparatus for the same, more particularly relates to a coding and decoding method of a motion picture and to an apparatus for the same.

2. Description of the Related Art

Among the systems for band compression of motion picture signals in image signal band compression technology, there are known the H.261, MPEG (Motion Picture Expert Group), and other practical technologies for international standardization.

Particularly, attempts have been made to apply the MPEG standard, which is a high efficiency image compression technology, in many fields such as computers, telecommunications, broadcasting, information, household electric appliances, and entertainment as a system for band compression of motion picture signals in multimedia. Below, the MPEG standard for motion picture compression and coding will be explained.

In general, the following proposals have been made for the MPEG standard according to different classifications:

MPEG1: For motion picture coding of a quality exceeding the allowable limit at around 1.5 Mbps MPEG2: For high quality motion picture coding at around 2.16 Mbps MPEG3: For high definition television (HDTV) signal coding at 50 to 80 Mbps In the present invention, mainly the MPEG1 and MPEG2 standards will be referred to. In the present specification, where "MPEG" is mentioned, it means either the MPEG1 or MPEG2 standard. Further, the coding and decoding system by the MPEG standard will be abbreviated as the MPEG standard.

In the MPEG standard, the coding or decoding is carried out for every plurality of pictures referred to as a "GOP (group of pictures)" each comprised of said plurality of pictures (images). The GOP is a unit of image transmission and also a unit of the coding and decoding in the MPEG standard.

For example, taking as an example a television picture, which is comprised of a series of individual frames (or fields) of image data (video data or pictures), the pictures in the GOP are not simple pictures of individual frames, that is, not a series of I (Intra)-pictures (intra-frame coding pictures). Use is made of pictures predicted by using motion compensation and other techniques for improving the efficiency of coding and thereby reducing the amount of the data transmitted. As such predicted pictures, there are known the P (prediction)-pictures (forward prediction coding pictures) and B (bidirection)-pictures (bidirectional prediction (outer insertion-inner insertion) coding pictures).

Accordingly, a GOP contains a set of pictures comprised of a mixture of a plurality of I-pictures, P-pictures, and B-pictures.

Details of the GOP, I-picture, P-picture, and B-picture and the relationship among them will be explained later.

In the MPEG standard, basically the coding and decoding are carried out in units of GOP's. Therefore, in order to perform processing of image data such as the image coding and decoding in a communication system, the coding and decoding in an image editing system, and the coding and decoding in other systems, the GOP's are desirably completely independent from each other.

The inventors of the present application considered the MPEG standard and GOP's and as a result became aware of the disadvantage that an image could not be correctly reproduced if the pictures were changed by editing work or the like since the GOP's are not in fact completely independent from each other.

That is, it is not possible to process a B-picture in a certain GOP without referring to the I-picture or P-picture contained in the previous GOP. In other words, the GOP's are not completely independent from each other.

In other words, in high efficiency image compression of a motion picture such as that represented by the MPEG standard, since use is made of the technique of prediction coding based on the differential information of the two-dimensional image before and after a frame and motion information, the frames are not independent from each other. Therefore, it is not possible to edit freely for each individual frame like with a usual video signal.

To deal with this incomplete independence of the GOP's, measures such as "broken links" and "closed GOP's" have been taken for the GOP's, but these do not solve the disadvantage caused when editing the pictures.

Note that details of the above-mentioned disadvantages and the specific content of the same will be explained later by referring to specific contents of the GOP, I-picture, P-picture, and B-picture.

SUMMARY OF THE INVENTION

Accordingly, an object of the present invention is to provide an image coding method for overcoming the disadvantages caused due to the incomplete independence of the GOP's and an apparatus for the same.

The present invention basically provides an image data processing method in a signal processing method for coding a picture sequence comprised of I-pictures, P-pictures, and B-pictures accommodated in GOP's, characterized in that when the pictures of a certain GOP among a series of GOP's are changed, the coding is performed replacing the first picture of the sequence of the changed pictures of the GOP with an I-picture of a picture number prescribed in accordance with the position of change so that coding is possible without existence of a picture in the preceding GOP.

When the pictures are changed, the new GOP starts from an I-picture, so the picture of the preceding GOP is not required.

The present invention in particular provides an editing method which maintains the original characteristic features possessed by the MPEG standard, that is of enabling editing in units of GOP's, and does not exert an influence upon the image quality in principle in unit of "cuts" in editing etc. Namely, according to the present invention, there is provided an image data processing method in a signal processing method for coding a picture sequence by every of a series of GOP's comprised of I-pictures, P-pictures, and B-pictures accommodated in GOP's by using the MPEG standard, characterized by making cuts possible at any position positions; preparing for all cut positions all the cut sequences defining the number of pictures N and the number of the first I-picture of the cut GOP, defined by the number of pictures and the picture cycle in the GOP's of the usual sequence, the pictures of the GOP's before the cut sequences, and an amount of delay when pictures are changed at the cut positions in the GOP's; reading out a corresponding cut sequence when a cut is made at a certain position and setting the first I-picture and the number of pictures of the GOP of the cut, the number of pictures of the GOP before the cut, and the picture preceding the new I-picture of the cut; rearranging the pictures in accordance with the set pictures and number of pictures to compose the GOP; and coding based on the composed picture sequence and the amount of the delay.

The above-mentioned cut can be made based on an editing decision list prepared in the editing process and also be otherwise freely made, for example, can be made periodically, can be made in accordance with the situation of the video scenes, and can be freely made manually by the user.

Preferably, the pictures of the cut GOP are set so that two B-pictures always follow when an I-picture or a P-picture is indicated or so that an I-picture or a P-picture is always placed if two B-pictures continue.

Further, according to the present invention, there is provided an image data processing apparatus characterized in that it has a means for providing image data for every of a series of GOP's comprised of I-pictures, P-pictures, and B-pictures accommodated in GOP's; a cut sequence preparing means for preparing for all cut positions all the cut sequences defining the number of pictures N and the number of the first I-picture of the cut GOP, defined by the number of pictures and the picture cycle in the GOP's of the usual sequence, the pictures of the GOP's before the out sequences, and a delay amount when pictures are changed at the cut positions in the GOP's; a cut processing means for reading out a corresponding cut sequence when a cut is made at a certain position of image data provided from said image data providing means and setting the first I-picture and the number of pictures of the GOP of the cut, the number of pictures of the GOP before the cut, and the picture preceding the new I-picture of the cut and rearranging the pictures in accordance with the set pictures and number of pictures to compose the GOP; a means for delaying the image data output from the image data providing means in accordance with the amount of delay; and a coding means for coding the picture sequence of the GOP which was rearranged and the delayed image data based on the MPEG standard.

BRIEF DESCRIPTION OF THE DRAWINGS

These and other objects and features of the present invention will become clearer from the following description of the preferred embodiments made with reference to the accompanying drawings in which.

DESCRIPTION OF THE PREFERRED EMBODIMENTS

Before explaining the preferred embodiments of the present invention, an example of the system to which the MPEG standard is applied and a picture (image) to be processed by the MPEG standard will be explained.

Coding and Decoding System in Image Transmission System

Figure 1:
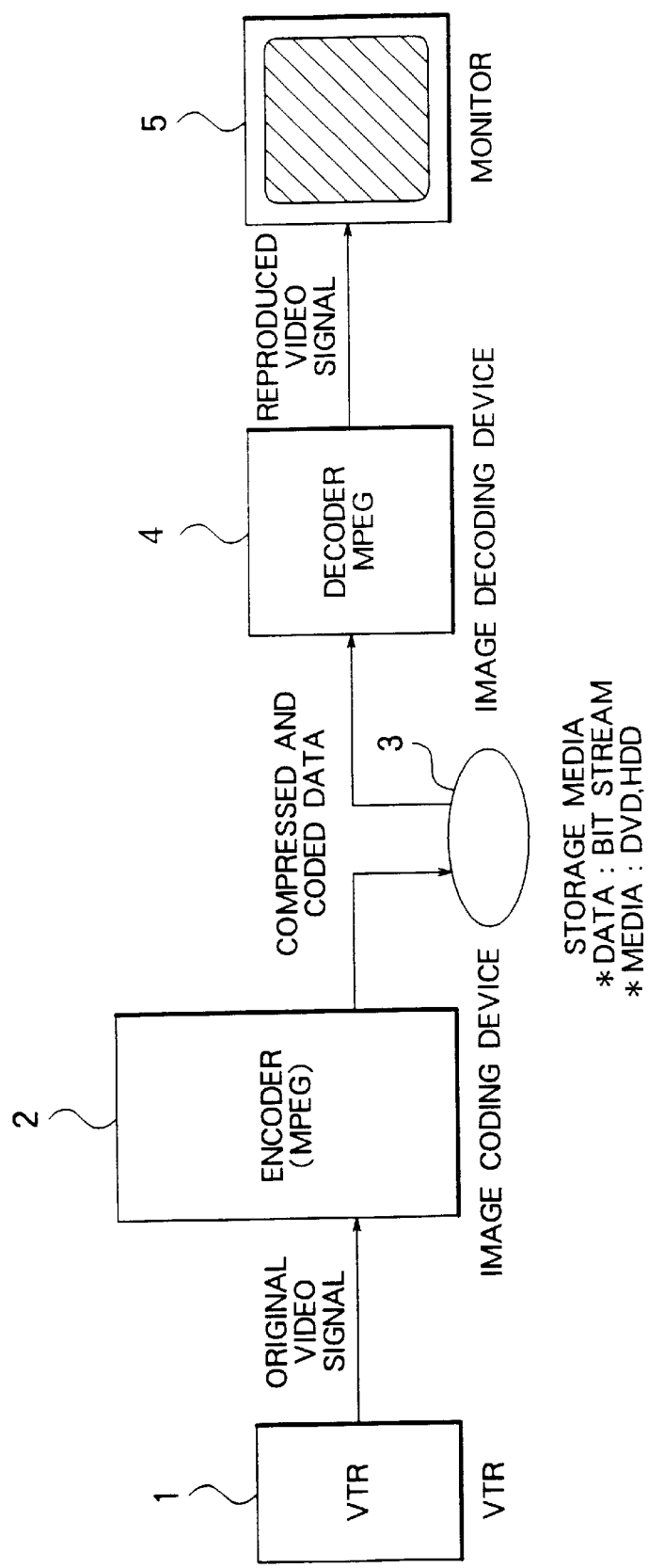
FIG. 1 is a view of the system configuration of an image coding device and an image decoding device in an image transmission system as an example of the system configuration to which the MPEG standard is applied.

FIG. 1 is a view of the system configuration of an image coding device and an image decoding device in an image transmission system as an example of the system configuration to which the MPEG standard is applied.

This system is used in a communication service such as for example a video-on-demand (VOD) service. Further, this system can also be applied to a system for decoding a video signal recorded on a digital video disc (DVD) used as the storage medium 3 in the system explained later referring to FIG. 7.

In this image coding and decoding system, every frame's worth of the original digital video signal (frame image data or frame picture) reproduced at the video tape recording and reproducing apparatus (VTR) 1 is subjected to band compression and coding for every picture of the frame at an image coding device 2 and transmitted to a storage medium 3 (or a transmission line). As the storage medium 3, for example, a DVD, hard disk drive (HDD), etc. may be illustrated. When these recording media are used, the band-compressed and coded image data is recorded and read out. In the case of the transmission line 3, the band-compressed and coded image data is transmitted on the transmission line as a bit stream. An image decoding device 4 performs decoding processing reverse to the coding in the image coding device 2 on the band-compressed and coded image data input via the storage medium 3 (or transmission line) to reproduce image data equivalent to that output from the VTR 1 and makes a TV monitor 5 display the reproduced image.

The compression and coding of the image data based on the MPEG standard are carried out in the image coding device 2. The band expansion and decoding processing is carried out in the image decoding device 4.

Coding Device

Figure 2:
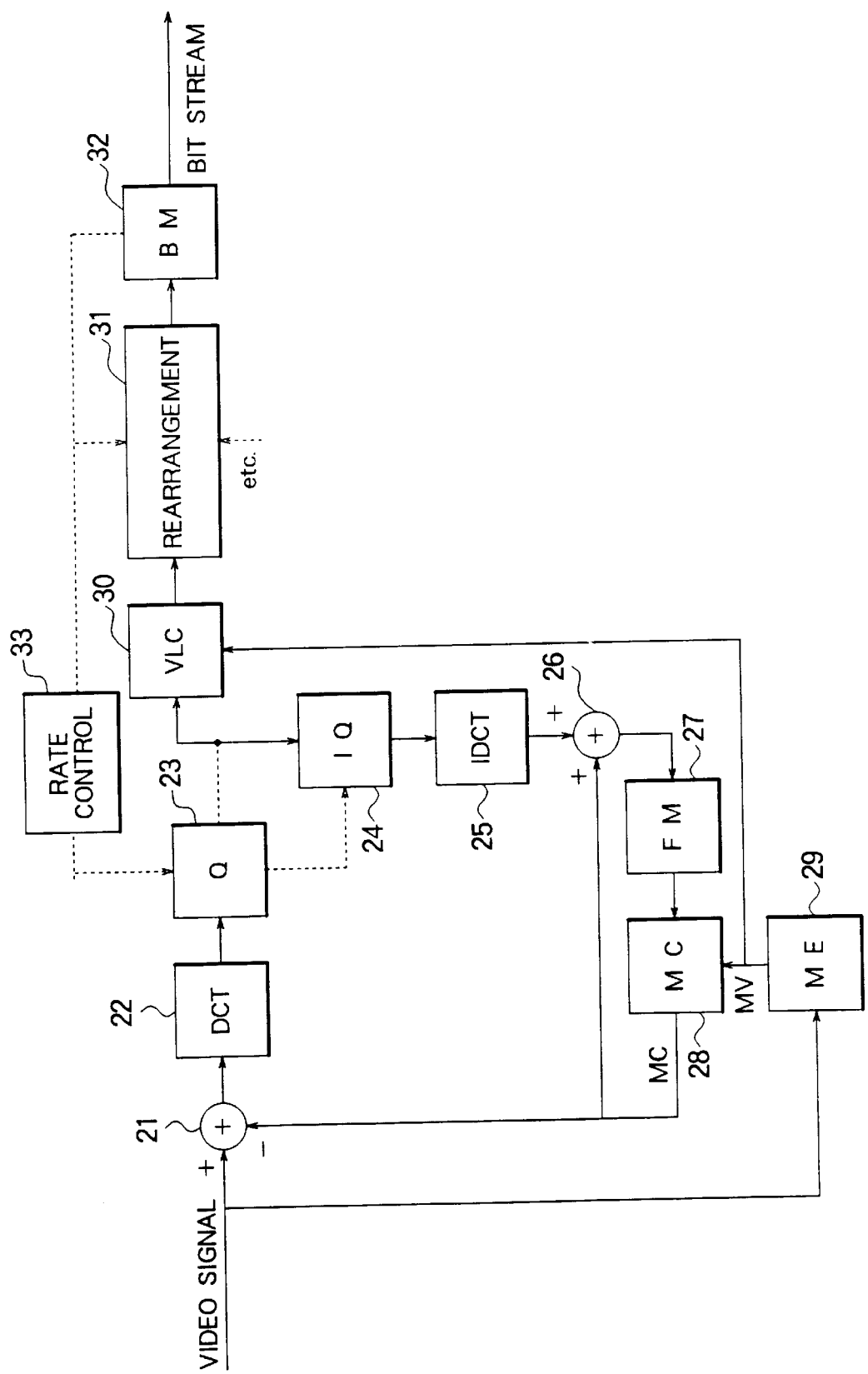
FIG. 2 is a view of an example of the configuration showing the coding processing in the image coding device 2.

FIG. 2 is a view of an example of the configuration showing the coding processing in the image coding device 2. This image coding device 2 is constituted by a signal subtracter 21, a discrete cosine transform (DCT) circuit 22, a quantizer (Q) 23, an inverse quantizer (IQ) 24, an inverse discrete cosine transform circuit (IDCT circuit) 25, a signal adder 26, a frame memory 27, a motion compensation circuit 28, a motion estimation circuit 29, a variable length coding circuit (VLC) 30, a rearrangement circuit 31, a buffer memory 32, and a rate control circuit 33.

In some image coding devices, a circuit for rearranging the pictures of the input video signal (image data) is sometimes provided in front of the signal subtracter 21. In this example, an example is shown of arranging such a rearrangement circuit 31 in front of the buffer memory 32.

The coding processing of intra-frame pictures will be explained next. A digital video signal (image data) of a time domain signal format input from the VTR 1 illustrated in FIG. 1 is converted to the format of a luminance signal Y, a first color difference signal Cb, and a second color difference signal Cr compatible with the MPEG1 or MPEG2 standard by a not illustrated format conversion circuit and then passes through the signal subtracter 21 and is subjected to discrete cosine transform processing in the DCT circuit 22 in the frame DCT mode or field DCT mode in units of blocks each consisting of for example 8×8 pixels or 16×16 pixels so as to be transformed from the input time domain image data to frequency domain image data. Namely, the DCT circuit 22, which is a type of orthogonal transformation circuit, performs frequency conversion on the image data to reduce the spatial redundancy. The frequency-converted image data is quantized at the quantizer 23. The input image data is then processed by the motion estimation circuit 29 to estimate the motion of the motion picture. The quantized image data is subjected to variable length coding based on the result of the motion estimation (motion vector MV) in the variable length coding circuit 30. Namely, the variable length coding allocates a short code to data having a high frequency of appearance and allocates a long code to data having a low frequency of appearance so as to reduce the overall transmission rate. The variable length-coded image data is rearranged at the rearrangement circuit 31, stored in the buffer memory 32, and output to the storage medium 3 (or transmission line) illustrated in FIG. 1.

In the coding by the MPEG standard, which covers three types of pictures, that is, the I-pictures, P-pictures, and B-pictures, it is not possible to apply the method of negative feedback of the quantization scale based on the capacity of a single buffer memory, therefore the rate control circuit 33 is used for the bit distribution to the pictures, the rate control using a virtual buffer memory, and the adaptive quantization considering the characteristics of human vision.

In this way, by the transform processing in the DCT circuit 22 and the coding in the quantizer 23 and the variable length coding circuit 30, the input image data is band compressed and coded to become image data of a small amount of bits.

The motion estimation and motion compensation of the motion picture data will be explained next.

The image data quantized at the quantizer 23 is inversely quantized to the image data corresponding to the output of the DCT circuit 22 at the inverse quantizer 24. The reverse transformation of that by the DCT circuit 22 is carried out on the inversely quantized image data at the IDCT circuit 25 to inversely transform (restore) it to the image data corresponding to that before input to the DCT circuit 22. The result is stored in the frame memory 27 through the signal adder 26. The image data stored in the frame memory 27 corresponds to data obtained by restoring the image data input to the signal subtracter 21. The motion compensation image data for the restored image data stored in the frame memory 27 is generated in the motion compensation circuit 28 by referring to the motion vector MV from the motion estimation circuit 29. The motion compensation image data is subtracted from the input image data supplied to the signal subtracter 21 and used for calculating the image data of the difference from the input image data. By using the differential image data from the signal subtracter 21, the amount of the data in the signal processing of the DCT circuit 22 and the following units is reduced. As a result, the amount of data to be processed at the quantizer 23, the variable length coding circuit 30, and the rearrangement circuit 31 is reduced.

The motion compensation image data is supplied to the signal adder 26 and added to the restored image data from the IDCT circuit 25 for use for restoring the original image data.

Decoding Device

Figure 3:
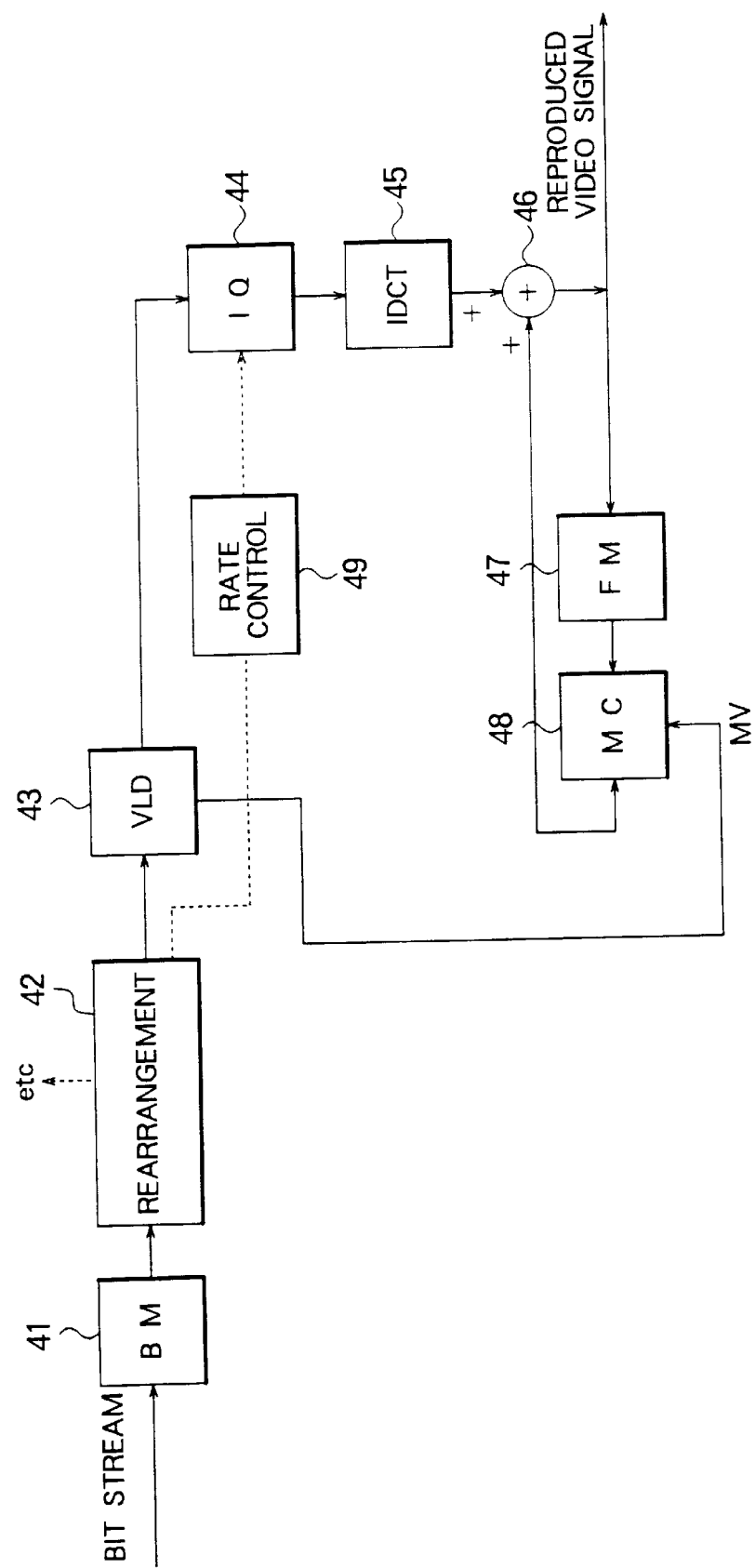
FIG. 3 is a view of an example of the configuration showing the decoding processing in the image decoding device 4.

FIG. 3 is a view of an example of the configuration showing the decoding processing in the image decoding device 4.

The image decoding device 4 is constituted by a buffer memory 41, a rearrangement circuit 42, a variable length decoding circuit (VLD) 43, an inverse quantizer (IQ) 44, a inverse discrete cosine transform circuit (IDCT circuit) 45, a signal subtracter 46, a frame memory 47, a motion compensation circuit 48, and a rate control circuit 49.

The image decoding device 4 performs the reverse processing to that of the image coding device 2, therefore the position of the buffer memory 41 becomes reverse to that of the buffer memory 32 of FIG. 2, the position of the rearrangement circuit 42 becomes reverse to that of the rearrangement circuit 31, and the position of the variable length decoding circuit 43 becomes reverse to that of the variable length coding circuit 30. The inverse guantizer 44 is substantially the same as the inverse quantizer 24 of FIG. 2, the IDCT circuit 45 is substantially the same in circuitry as the IDCT circuit 25, the signal adder 46 is substantially the same as the signal adder 26, the frame memory 47 is substantially the same as the frame memory 27, and the motion compensation circuit 48 is substantially the same as the motion compensation circuit 28.

The buffer memory 41 stores the band-compressed and coded image data transmitted via the storage medium 3 (or transmission line), the rearrangement circuit 42 rearranges the order of the image data of the order input to the buffer memory 32, and the variable length decoding circuit 43 performs decoding reverse to the processing of the variable length coding circuit 30 of the image coding device 2. The result thereof is subjected to inverse quantization at the inverse quantizer 44, the frequency domain image data is transformed to time domain image data at the IDCT circuit 45, and the result is stored in the frame memory 47 via the signal subtracter 46. The image data stored in the frame memory 47 is subject to motion compensation at the motion compensation circuit 48 by referring to the result of the variable length decoding circuit 43. The result thereof is added to the result of transformation of the IDCT circuit 45 at the signal subtracter 46. The image data reproduced from the signal subtracter 46 is then output to the TV monitor 5.

Also at the time of decoding as well, the rate control circuit 49 performs the bit distribution to the pictures, rate control using the virtual buffer memory, and the adaptive quantization considering the characteristics of human vision.

The signal transmission system shown in FIG. 1 performs the coding and the decoding of the image data as described above. These processings, however, will be explained further in relation to the pictures.

Configuration of Pictures

Figure 4:
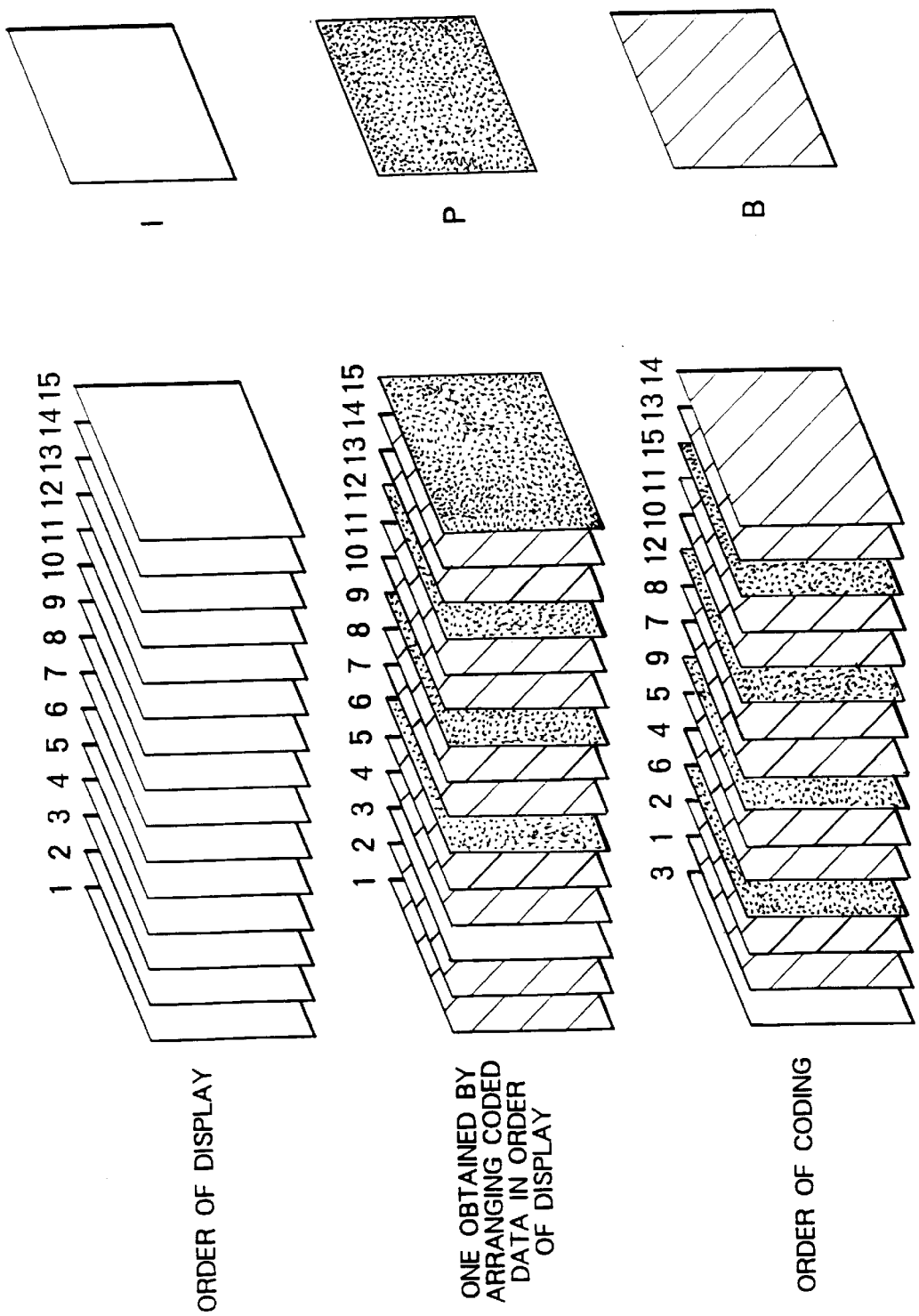
FIG. 4 is a diagram of the coding order in the MPEG standard.

FIG. 4 is a diagram showing the coding order in the MPEG standard.

Figure 5:
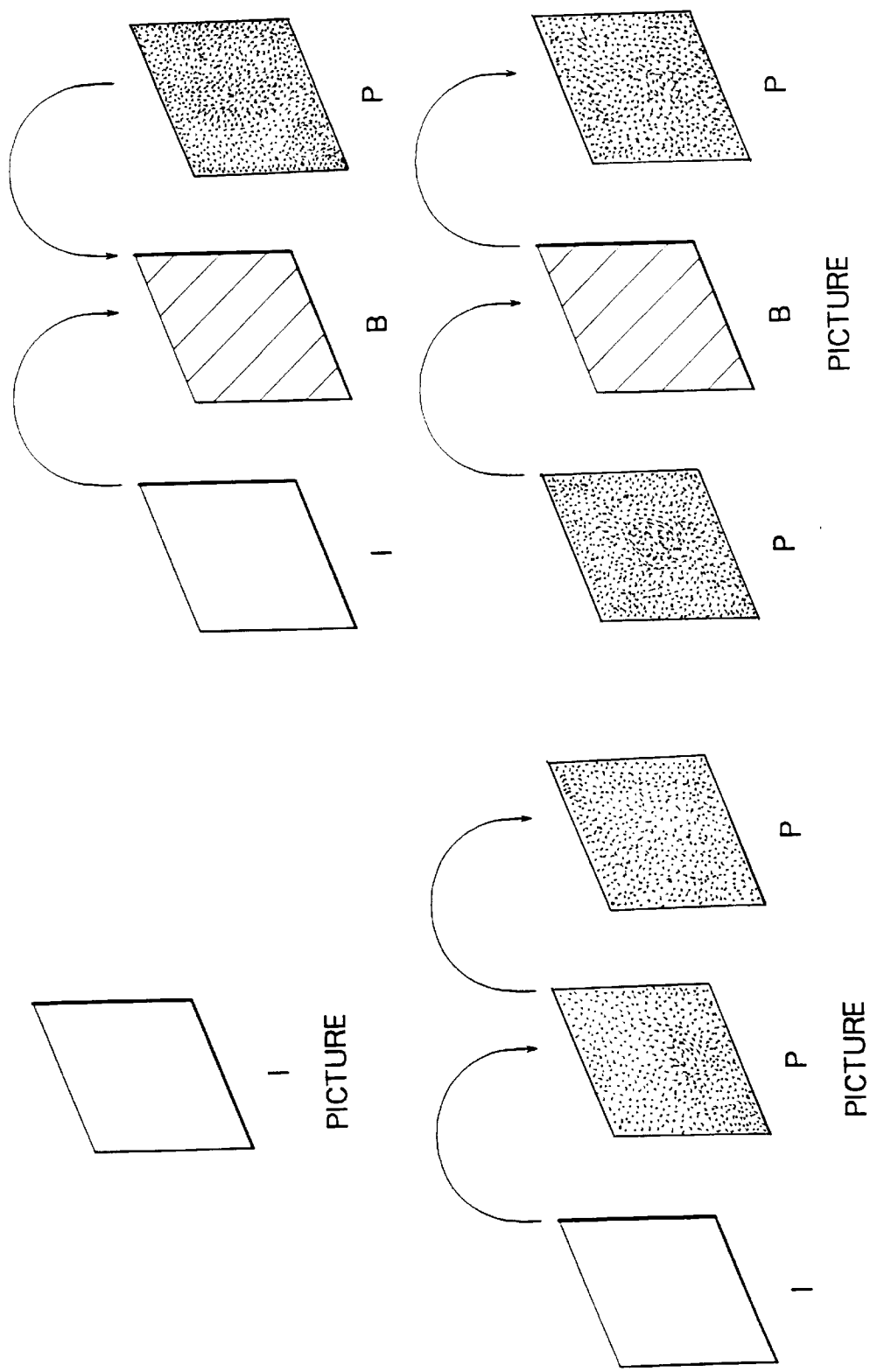
FIG. 5 is a diagram showing the meaning of the pictures shown in FIG. 4 and the relationship of the same.

FIG. 5 is a diagram showing the meaning of the pictures shown in FIG. 4 and the relationship among the same.

The letter "I" indicates an I (Intra)-picture (intra-frame coding picture), the letter "P" indicates a P (Prediction)-picture (forward prediction coding picture), and the letter "B" indicates a B (Bidirection)-picture (bidirectional prediction (outer insertion-inner insertion) coding picture).

An I-picture is a certain picture, for example, frame, which can be independently reproduced by itself. For example, where a coded I-picture is transmitted from the image coding device 2, the image decoding device 4 can decode that I-picture by just that I-picture.

A P-picture is an image coded using prediction from an I-picture or a P-picture existing preceding it (in the past). For this reason, the image decoding device 4 performs motion compensation and predicts the picture to obtain the P-picture.

A B-picture is an image using both prediction from the I-picture or the P-picture existing preceding it (in the past) and prediction from the I-picture or the P-picture existing after it (in the future). In this case as well, the image decoding device 4 predicts the picture to obtain the B-picture.

Figure 6:
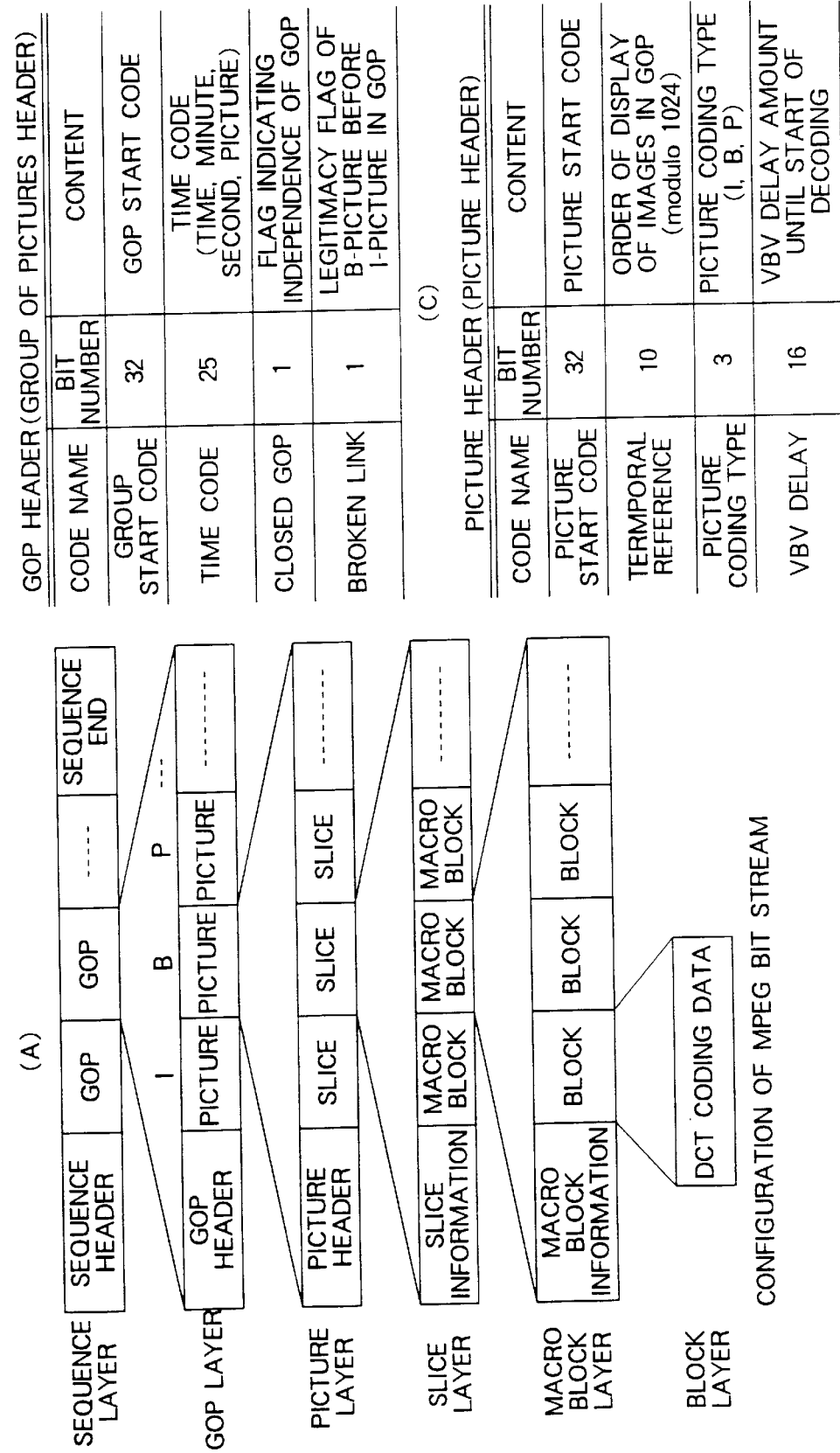
FIG. 6A is a diagram showing the configuration of a bit stream of the MPEG standard showing the configuration of a GOP.
FIG. 6B is a view showing the contents of the GOP header.
FIG. 6C is a view showing the contents of the picture header.

FIG. 6A is a diagram showing the configuration of the bit stream of the MPEG standard showing the configuration of a GOP; FIG. 6B is a view of the contents of a GOP header; and FIG. 6C is a view of the contents of a picture header.

In the bit stream of the MPEG standard, the sequence layer is at the uppermost layer and comprises a series of a plurality of GOP's.

Each GOP is comprised by a GOP header for storing the contents shown in FIG. 6A and series of a plurality of picture layers.

Each picture layer is comprised by a picture header for storing the contents shown in FIG. 6C and a series of a plurality of slice layers.

Each slice layer is comprised of a part for storing the slice information and a series of a plurality of macro blocks.

Each macro block layer is comprised of a part for storing the macro block information and a series of a plurality of blocks.

Each block layer stores the above DCT-coded image data.

Figure 7:
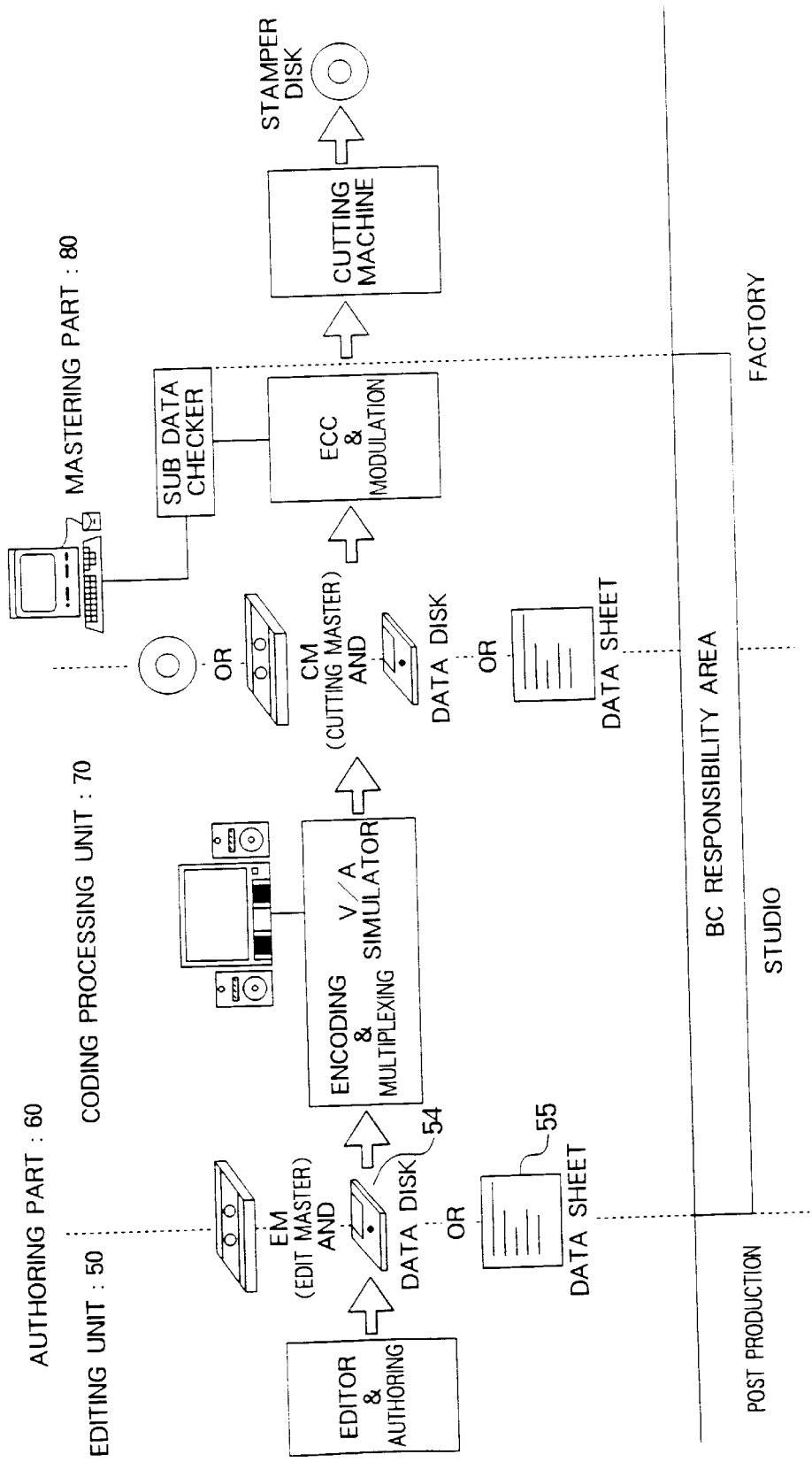
FIG. 7 is a view of the configuration of a DVD use editing system.
Figure 8:
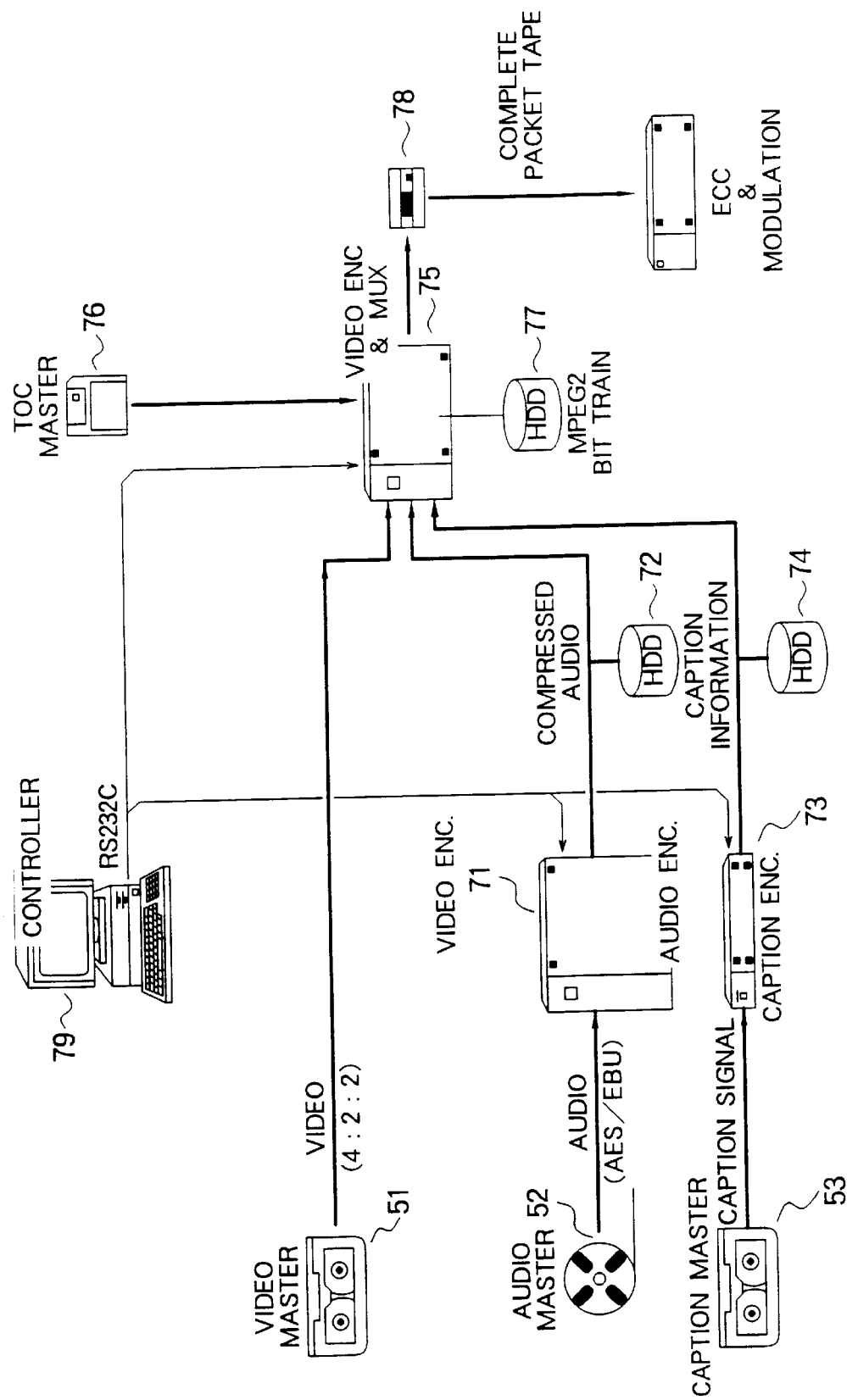
FIG. 8 is a view of the configuration of an authoring system shown in FIG. 7.

FIG. 7 is a view of the configuration of an editing system for a DVD. FIG. 8 is a view of the configuration of an authoring system shown in FIG. 7.

The DVD use editing system is constituted by an editing unit 50, an authoring system 60, a coding unit 70, and a mastering unit 80.

The editing unit 50 edits the video signals and audio signals for the video content of movies, TV programs, etc. so as to prepare video signals recorded on a cassette video tape 51 as an edit master, audio signals recorded on a magnetic tape 52 as an audio master, and data recorded on a cassette tape 53 as a caption master. The status of the editing and recording is noted on a disk 54 and a data sheet 55.

The authoring system 60 and the coding unit 70 read the video signals from the edit master, while the video coding device 75 codes the video signals so as to form a bit train of the MPEG2 standard. Further, the audio signals are compressed and coded at an audio coding device 71 and recorded in the HDD 72. The caption data is coded in a caption coding device 73 and stored in the HDD 74, therefore the coded audio signals and coded caption data stored in the HDD 72 and HDD 74 are synchronized and arranged in the form of a bit train of the MPEG2 standard in the video coding device 75 and stored in the HDD 77. The above processing is carried out by using a TOC (Table of Contents) read from a TOC master storage disk 76. The results thereof are stored on a complete packet tape 78. These processings are controlled by a controller 79.

The coding unit 70 and the mastering unit 80 add an error correction code (ECC), modulate the signals, and transmit the result to a cutting machine, where a stamper disk is produced. The DVD's are fabricated from this stamper disk.

A DVD generated in this way can be used as one of the storage media 3 shown in FIG. 1.

Below, details of the GOP and pictures will be explained in relation to the editing of the video signal referring to FIG. 9.

Figure 9:
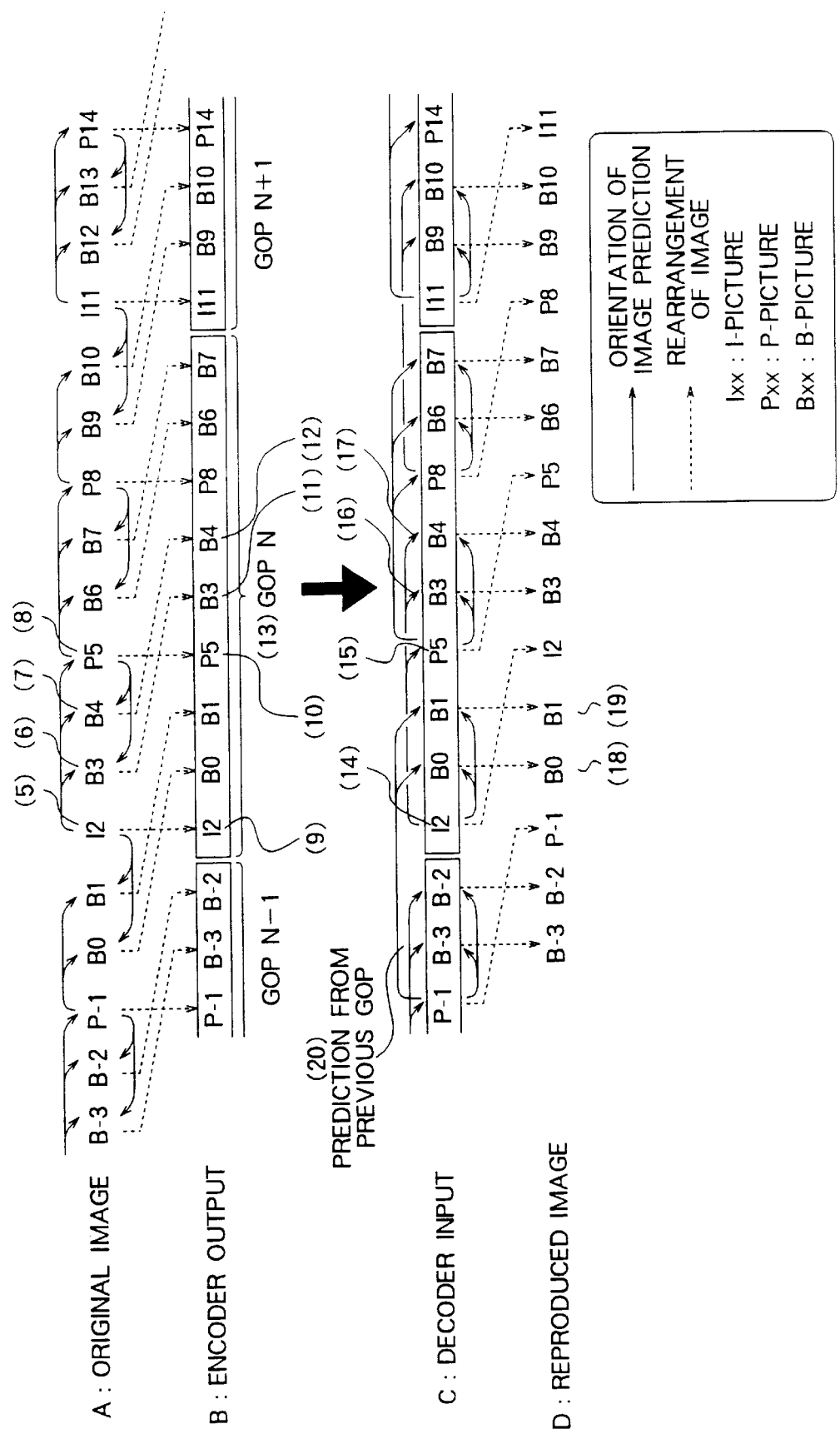
FIG. 9 is a diagram showing the state of an image train of the general MPEG standard.

FIG. 9 is a diagram showing the state of a general image train of the MPEG standard.

The illustration in this figure shows a section of a continuous long image (picture train) cut out from the middle and shows using a representative example what type of pictures the original image (original picture before coding) is compressed and coded (encoded) to and in what order they are arranged.

Regarding the numbers attached to the I-pictures, B-pictures, and P-pictures, for example, B3 shows that the B-picture relates to the third picture of the original image (original picture before coding). Note that the small numbers show the past, and the large numbers show the future. The solid arrows show the relationship of which picture is predicted from which picture.

Explanation That GOP's Are Not Completely Independent

The original image A shown in FIG. 9 is sequentially compressed and coded in the following order in the image coding device 2 shown in for example FIG. 1 or FIG. 2 or the coding device (referred to as an encoder) shown in FIG. 7 or FIG. 8.

"B-3 - B-2 - P-1 - B0 - B1 - I2 - B3 - B4 - P5 - B6 - B7 - P8 - B9 - B10 - I11 - B12 - B13 - P14"

This picture train will be explained next. As indicated by the solid arrows, for example, the I2-picture at the position 5 (numerals shown in parentheses indicate the positions of the pictures (images)) is used for the forward prediction of the three pictures of the B3-picture of position 6, the B4-picture of position 7, and the P5-picture of position 8. The B3-picture of position 6 and the B4-picture of position 7 are used for the backward prediction from the P5-picture of position 8.

The pictures subjected to the compression and encoding at the encoder are rearranged as shown by the encoder output B for convenience at the time of decoding in the image decoding device (decoder).

For example, the I2-picture at the position 5 of the original image A is placed at the position 9 at the encoder 10 output, while the B3-picture at the position 6 and the B4-picture at the position 7 are placed at the position 11 and the position 12 behind the P5-picture at the position 10 shifted backward. By doing this, as shown by the decoder input C, for example, the I2-picture at the position 14 and the P5-picture at the position 15 necessary for reproducing the B3-picture at the position 16 and the B4-picture at the position 17 can be decoded first.

At the encoder output B, the pictures from one I-picture (for example, the I2-picture) to before the next I-picture (for example, the I11-picture), that is, up to the B7-picture, are referred to as a GOP. While a GOP has the configuration illustrated in FIG. 6A, in the following description, only the pictures will be indicated. The GOP shown at the position 13 shows only nine pictures. This however is because it is shown simplified.

The inventors of the present application considered the GOP's of the MPEG standard and as a result discovered that the following disadvantage existed. That is, since the GOP's are not completely independent, an image could not be correctly reproduced if the pictures were changed by editing work or the like.

Details of this will be clarified below by explaining in detail the specific contents of the MPEG standard and GOP's.

Here, attention would like to be drawn to the reproduction of the B0-picture at the position 18 and the B1-picture at the position 19 shown in the reproduced image D reproduced by the decoder.

Seen from the viewpoint of the configuration of the GOP, the B0-picture and the B1-picture are contained in the same GOP as that of the I2-picture, that is, the "GOP N (position 13)". For the reproduction of these, however, prediction (position 20) from the P-picture (P1-picture) and I-picture (I2-picture) contained in the preceding GOP, that is, the "GOP N−1", becomes necessary. That is, the "GOP N (position 13)" uses the P1-picture in the preceding "GOP N−1", therefore is linked with the "GOP N−1". Accordingly, the "GOP's are not completely independent".

Problem of Editing Due to Incomplete Independence of GOP's

It is usually said that GOP's are independent and that editing can be independently carried out for every GOP, but strictly speaking they are not independent. Of course, where continuously processing the pictures in GOP's, the problem is that it is rare that non-independence of the GOP's becomes a problem, but when editing by cutting at a certain scene, when decoding pictures after the transmission of the GOP's has been interrupted, and other cases, this non-independence of the GOP's becomes a problem.

This problem will be explained in further detail below using as an illustration the case of the editing shown in FIG. 7 and FIG. 8.

Figure 10:
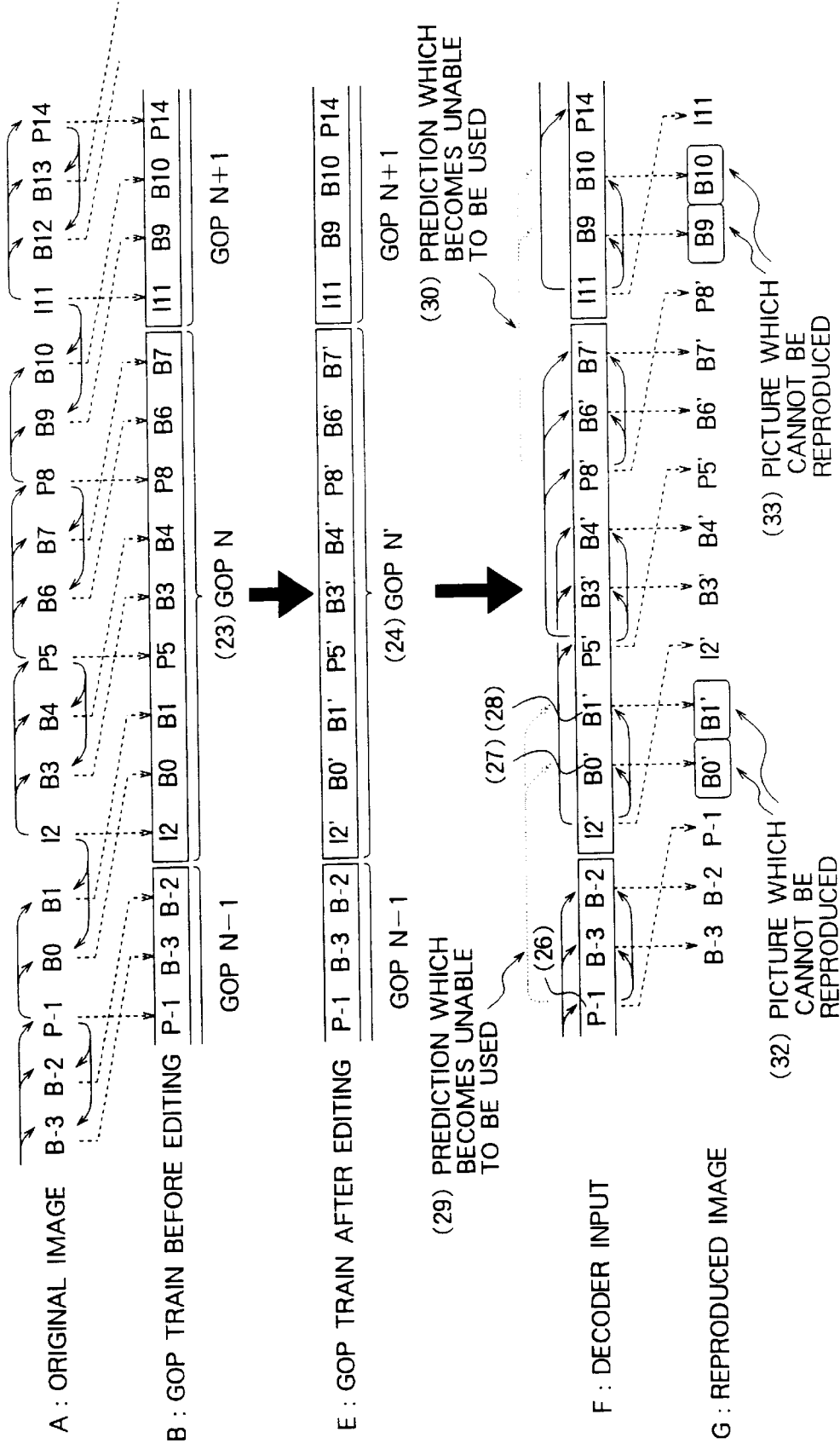
FIG. 10 is a view for explaining the disadvantage caused when performing image editing in units of GOP's in the editing system shown in FIG. 7 and FIG. 8.

FIG. 10 is a view explaining the problem caused when editing an image in units of GOP's in the editing system shown in FIG. 7 and FIG. 8.

The original image A has the same configuration as that illustrated in FIG. 9.

The train of GOP's continuously compressed and encoded by the encoder will be referred to as the "GOP train B before the editing". This GOP train B before the editing has the same configuration as that of the GOP train of the encoder output B shown in FIG. 9.

In this example, it is assumed that the editing for changing (rearranging)

a picture train of the "GOP N (position 23)":

I2, B0, B1, P5, B3, B4, P8, B6, B7 with a picture train shown as "GOP N' (position 24)":

I2', B0', B1', P5', B3', B4', P8', B6', B7' is carried out to obtain the "GOP train E after editing".

This GOP train E after editing shows that the order of the I-picture, B-pictures, and the P-picture is the same, but the pictures before editing not given the"'" mark are changed with pictures given the "'" mark.

The pictures of the "GOP N'" are the same in order as the order of the I-picture, B-pictures, and P-picture, therefore there is no problem in terms of the format. However, when viewing this as the decoder input F, in order to reproduce the changed B0'-picture (position 27) and the B1'-picture (position 28), forward prediction from the unchanged P-1-picture (position 26) becomes necessary. However, the editing has been already performed and the pictures have been changed, therefore there is no correlation between the unchanged P-1-picture (position 26) of the "GOP N−1" and the changed B0'-picture (position 27) and B1'-picture. (position 28) of the "GOP N". As a result, it becomes impossible to use the prediction (position 29) from the P-1-picture (position 26) for the decoding of the B0'-picture (position 27) and the B1'-picture (position 28).

A similar problem occurs also in the relationship between the last picture of the "GOP N'" and the pictures of the "GOP N+1", that is, the prediction (position 30) to the first two B-pictures (B9 and B10) of the "GOP N+1" no longer has any meaning.

Since, as described above, when editing an image, it is no longer possible to predict the first B-picture of the next GOP from the last P-picture of the preceding GOP, the reproduced image G after the editing processing will contain several incorrect B-pictures (positions 32 and 33) at the start of the GOP.

Up until now, the B-pictures which could not be reproduced were either skipped or changed with the P-pictures in the GOP immediately before, but of course the motion of that portion of the reproduced image ends up appearing unnatural.

In the MPEG2 standard, the problem caused when editing is carried out in units of GOP's after compression and encoding is handled by providing a "broken link" flag in the GOP header as shown in FIG. 6B so as to show that unusable B-pictures are contained in the GOP's before and after the editing point and thereby indicate the legitimacy of the B-pictures, but no measure is deviced for the restoration of the pictures per se.

However, the MPEG standard, as shown in FIG. 6B, provides a "closed GOP" showing the independence of the GOP's.

Figure 11:
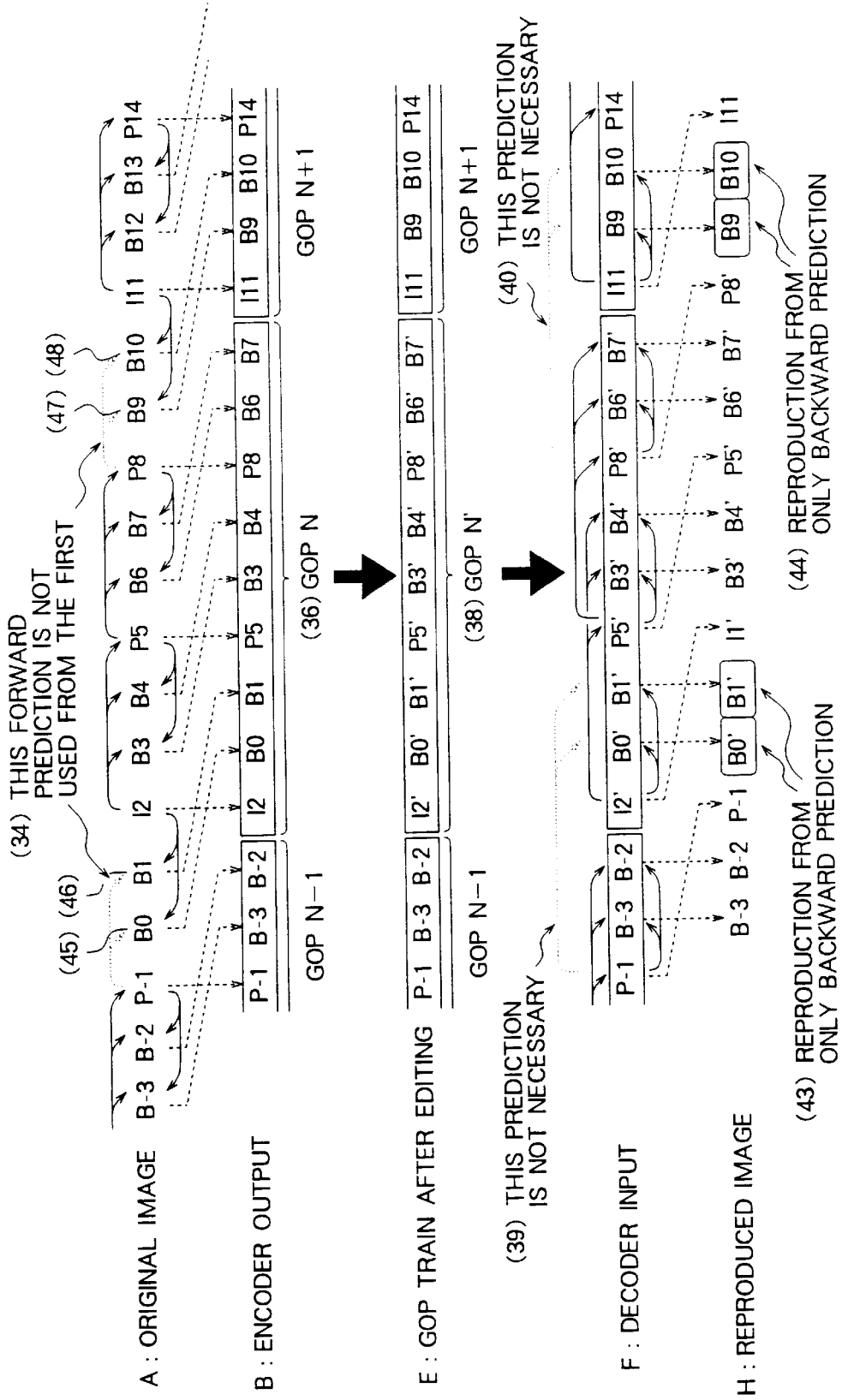
FIG. 11 is a diagram explaining the "closed GOP" in the MPEG standard.

A description will be made of this "closed GOP" enabling the editing referring to FIG. 11. The original image A, the GOP train B before editing, the GOP train E after editing, and the decoder input F in FIG. 11 are the same as those shown in FIG. 10.

The "closed GOP" is a concept designed to ensure the independence of a GOP by coding so as to perform prediction from only the I-picture immediately after in the order of the original pictures (only backward prediction) and not use "prediction from last I-picture and P-picture of the preceding GOP (position 34)" when encoding several of the B-pictures (positions 45, 46, 47, and 48) existing at the start of a GOP.

In the "closed GOP" concept, even if the "GOP N (position 36)" of the encoder output B is replaced with another "GOP N' (position 38)" obtained by changing the contents of the picture without changing the format of the picture so as to obtain the GOP train E after editing, since the decoder does not originally require the forward prediction (position 39 and position 40) from the previous GOP, it becomes possible to reproduce the several B-pictures (B0' and B1' at position 43 and B9 and B10 at position 44) existing immediately after the I-picture in the reproduced image H as well using only backward prediction from the I-picture. This method may seem at first glance to be a good means of solution, but includes inherent problems. The reason for this will be explained below.

Originally speaking, a B-picture was a picture which used prediction from both the forward and backward directions and therefore had the advantages that the accuracy of prediction was better compared with a P-picture for which only forward prediction was performed and that even if the number of quantization bits was lowered from that of a P-picture, the image quality would not be lowered. Namely, prediction from both directions has the property of improving the image quality while raising the bit efficiency. However, use of only one side of the encoding of a B-picture as explained above means that, since, in ordinary cases, a B-picture has a rougher level of quantization than a P-picture, it will only be possible to obtain an image of a lower quality than that when the encoding is carried out by only P-pictures. Accordingly, frequent use of "closed GOP's" in an attempt to impart editability will lead to the advantages of the B-pictures being cancelled out and therefore runs counter to the objective of use of B-pictures. The effect of using the B-pictures will therefore not be obtained.

As described above, in the MPEG standard, when changing pictures by editing as explained above, the problem is encountered of a reduction in the image quality. This type of problem is particularly serious in image processing requiring correct coding and decoding.

The above example related in particular to the problem caused by the partial change of pictures accompanying editing work, but the same type of problem as explained above is encountered regardless of editing work, for example, when the system shown in FIG. 1 is used for the transmission of video signals in the field of multimedia, when changing pictures in the bit stream in the same way as described above, for example, when replacing pictures along with switching a line to a backup system along with a system breakdown, etc.

Basic Proposal of the Present Invention

A description will be made below of the basic proposal of the present invention for solving the above problem.

First, a description will be made of the method of compression and coding serving as the basis of the present invention.

For the sequence of the compression and coding of the MPEG standard, in addition to the above method, it is also possible to form a special sequence for use at the start of a program. The effect when this sequence is used in the middle of an image train will be explained referring to FIG. 12.

Figure 12:
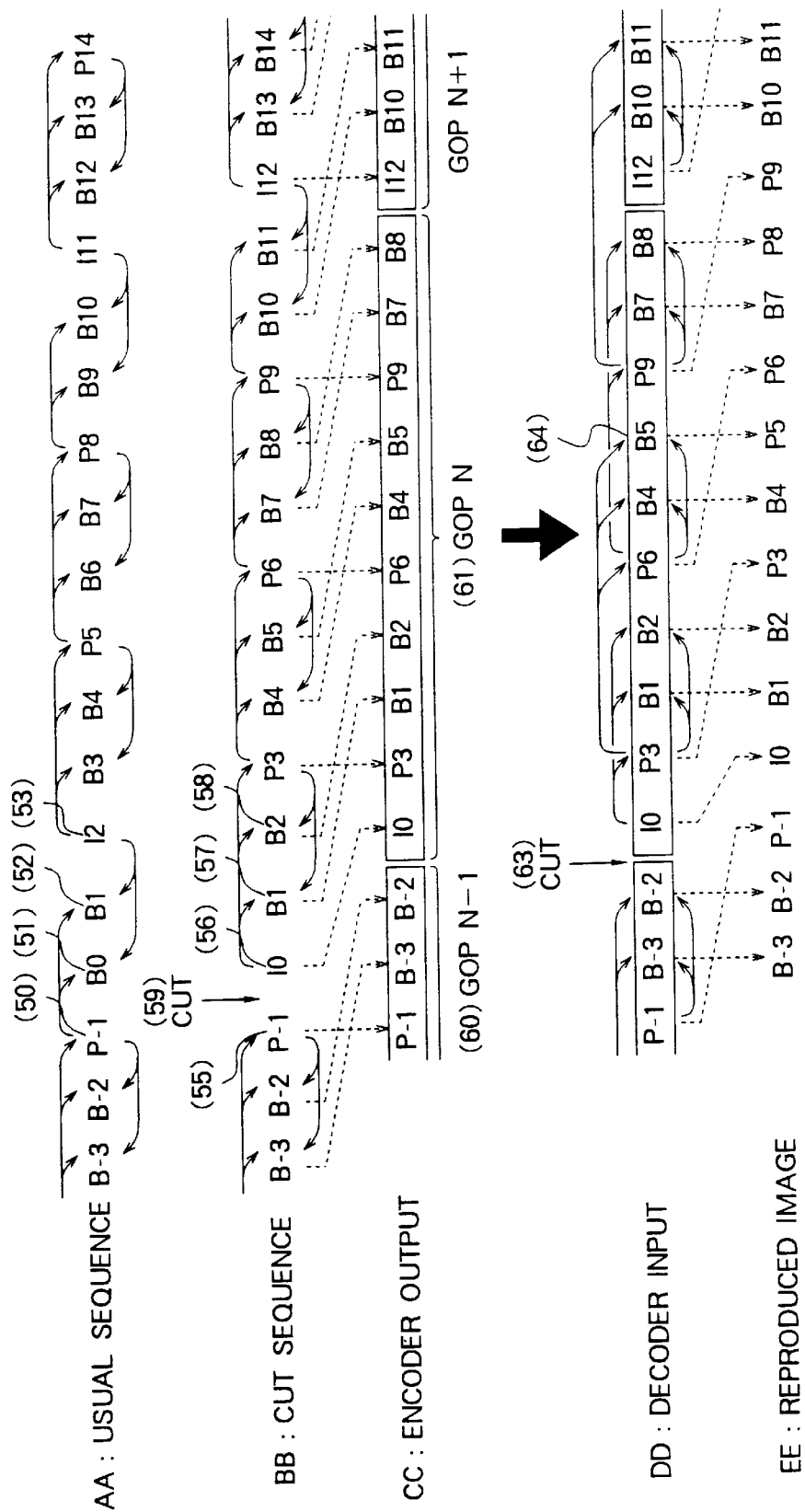
FIG. 12 is a diagram showing the compression and coding processing of the present invention.

FIG. 12 is a diagram showing the compression and coding processing of the present invention.

In the usual sequence AA, for example, the P-1-picture (position 50) is followed by the series of the B0-picture (position 51), B1-picture (position 52), and I2-picture (position 53), but in the present invention, a special sequence is considered separately from them. This will be referred to as a cut sequence BB.

In the cut sequence BB, a cut (position 59) is made once after the P-1-picture (position 55) immediately before the picture to be changed by the editing, the picture after this is made the I0-picture (position 56), and then the pictures continue in the same way as the usual sequence, for example, the B1-picture (position 57) and B2-picture (position 58).

The picture train of the usual sequence AA specifically becomes:

"B-3, B-2, P-1, B0, B1, I2, B3, B4, P5"

and generally becomes:

"B, B, P, B, B, I, B, B, P", but in the cut sequence BB, it specifically becomes:

"B-3, B-2, P-1, I0, B1, B2, P3, B4, B5, P6"

and generally becomes:

"B, B, P, I, B, B, P, B, B, P".

That is, the B-picture (B0-picture) at the cut position 59 is removed and the I-picture (I0-picture) is inserted. Due to this, the next GOP starts from an I-picture, is followed by a P-picture, and then is followed by the B-pictures.

By placing this cut, prediction of pictures becomes unnecessary between the "GOP N−1 (position 60)" and the "GOP N (position 61)" before and after the cut and the "GOP N−1 (position 60)" and the "GOP N (position 61)" become completely independent from each other.

Accordingly, when viewing the decoder input DD, even if the pictures after the cut at the position 63 are replaced with another GOP train (position 64) encoded by a sequence of a similar rule, the data can be reproduced with no problem (position 65). In addition, since the technique of the "closed GOP" explained above is not used either, there are no B-pictures obtained by only backward prediction, there is no deterioration of the image quality or other effect.

It is possible to use only the sequence explained in detail for encoding to compose the GOP's. In this case, there is no problem even when editing for every GOP, but the following sequence obtained when viewing this "sequence having a cut" by the encoder output:

IPBBPBBPBB,IPBBPBBPBB,IPBBPBBPBB,IPBBPBBPBB,

IPBBPBBPBB (where the commas indicate divisions between GOP's), compared with the usual sequence shown below:

IBBPBBPBB,IBBPBBPBB,IBBPBBPBB,IBBPBBPBB,

IBBPBBPBB, has a reduced 0.9 times the number of the I-pictures seen on an average when viewing the types of the composite pictures, but an increased 1.35 times the number of the P-pictures and conversely a reduced 0.9 times the number of the B-pictures. The ratio of the P-pictures is relatively increased, so the amount of bits generated by the coding is increased as well. Further, the rate of usage of the B-pictures, which have been said to be advantageous from the viewpoint of the image quality, is reduced. Due in part to this, while use of just a "cut sequence" to construct a GOP train may be said to be better than the method of use of closed GOP's", which is the standard method in the MPEG standard, it is difficult to call it the best method.

Further measures for improvement of the present invention will be explained next.

Basic Concept of Present Invention

Use of EDL, That is, BDIT DECISION LIST

When considering the purpose of application of an image compressed by the MPEG standard, in almost all cases the object is to provide a general user with a completed movie, drama, or other program such as in the case where the image is recorded in a package media such as a DVD in the system shown in FIG. 7 or the image is used for a communication service such as a VOD service as the use of the system of FIG. 1.

In such a case, in pretty much all instances, a video tape generally referred to as a "master" on which the completed program is recorded or one similar to this (edit master in FIG. 7, video master 51 and audio master 52 in FIG. 8, etc.) is played back and its signal is compressed and encoded. This "master" has been careful edited in the studio shown in FIG. 7 etc. under the direction of a director according to its final purpose of use. In other words, production of a "master" is always accompanied by editing.

In this editing process, the editing points are not selected at random for no purpose. For example, they are determined in accordance with the contents of the program and final purpose of use at the discretion and decision of the director for example for every scene. The editing points determined are put together in a list referred to as an edit decision list (usually referred to as an EDL) which is supplied to the editing machine etc. which actually performs the editing operation. The editing machine edits the stock based on the EDL to create the "master".

Seen from this characteristic of an EDL, an EDL can be said to be a list describing the locations with the highest possibility of editing if the situation arises where the "master" is to be edited again. If this is so, then while it might be desirable if editing could be freely performed in units of GOP's, viewed realistically it would be more efficient to consider editing only the locations having the highest possibility of editing. The present invention takes note of this fact, discards the conventional concept with regard to editing that "since where the editing will be performed is unknown, if editing cannot be performed in units of frames, at least let all of the boundaries between GOP's be made editable points", switches to the idea that "if editing can only be performed in units of GOP's anyway, rather than use halfway units such as GOP's, let the unit of editing be increased to the more human-oriented scenes of the video", and uses just the breaks between scenes in the video registered in advance based on the EDL or obtained by correcting the EDL as the possible editing points.

That is, viewing the present invention overall, before compressing and coding the video signal, the editing points indicated by the EDL accompanying the "master" and the locations for which the possibility of editing is considered are first registered as the cuts of "sequences having a cut", editing of the compressed image is made possible at the cuts (editing points of the EDL) so as not to influence the image quality, and, while denying editing for every GOP, a rate of use of the B-pictures equivalent to the usual encode sequence can be secured, so the effect is exhibited that the compression rate is not lowered.

Embodiment of the Present Invention

Figure 13:
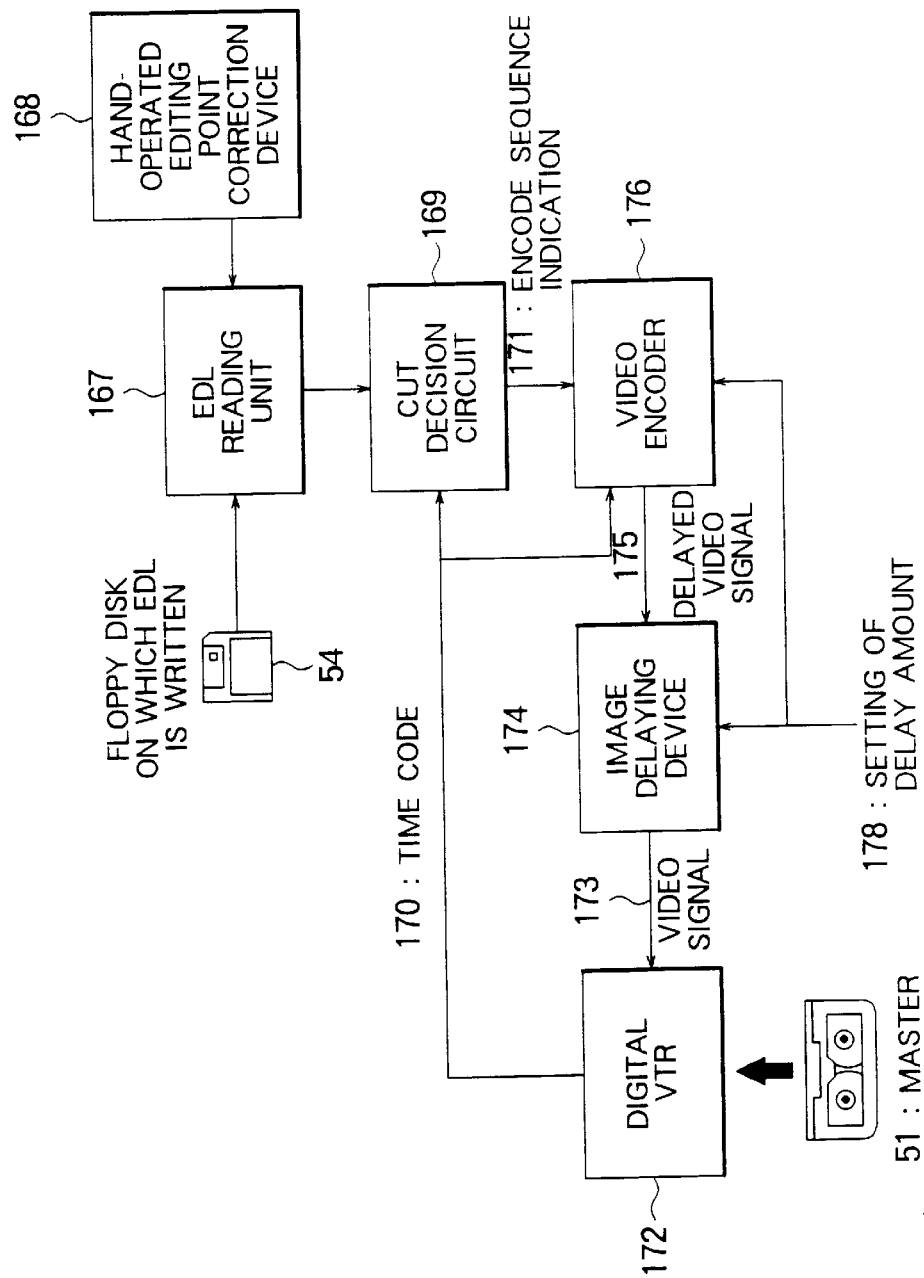
FIG. 13 is a view of the configuration of the video signal processing device of a first embodiment of the present invention.

FIG. 13 is a view of the configuration of a video signal processing device of a first embodiment of the present invention.

In the video signal processing device, a video master 51 (FIG. 8) on which the video signal to be compressed and encoded is recorded is played back at a digital VTR 172.

A floppy disk 54 (FIG. 8) on which the EDL accompanying the video master 51 is written is loaded into an EDL reading unit 167. The information on the editing points which is read may be modified by the addition or deletion of editing points by a manual editing point correction device 168. The information of the editing points of the video master 51 determined by the above means is sent to a cut decision circuit 169. Further, a time code (TC) is recorded in advance in the video master 51 played back at the digital VTR 172. The time code output 170 from the digital VTR 172 is sent to the cut decision circuit 169 and a video encoder 176 (corresponding to for example the encoder 75 of FIG. 8).

The cut decision circuit 169 makes a decision on what kind of compression sequences (how to arrange the I-pictures, P-pictures, and B-pictures) should be assembled considering the input editing point information and prepares a list of the correspondence between each frame number of the time code 170 input and the sequences of pictures. For example, for sequences not near an editing point, use is made of the usual sequence explained by referring to FIG. 12:

"B, B, P, B, B, I, B, B, P"

while near an editing point, use is made of a "sequence having a cut" explained referring to FIG. 12:

"B, B, P, I, B, B, P, B, B, P"

The order of encoding of the types of the pictures is determined in this way.

This operation will be explained below.

The digital VTR 172 starts the playback of the video master 51.

The cut decision circuit 169 sends information on what type of pictures the image corresponding to the time code should be compressed to as the encode sequence instruction information 171 to the video encoder 176 while establishing correspondence between the time code 170 being input and the sequences which have been found in advance.

On the other hand, the video signal 173 reproduced at the digital VTR 172 is sent to an image delaying device 174. The amount of delay 178 is set from the outside. The same amount of delay 178 as that is also sent to the video encoder 176 (the amount of delay 178 will be explained later). The delayed video signal 175 is input to the video encoder 176. The video encoder 176 receives as input the undelayed time code 170 and the encode sequence instruction information 171 accompanying this, therefore the video encoder 176 can determine what compression and encoding should be carried out at what timing in advance by just the amount of delay of the video signal.

Next, a description will be made of the encode sequence referring to FIG. 14.

Figure 14:
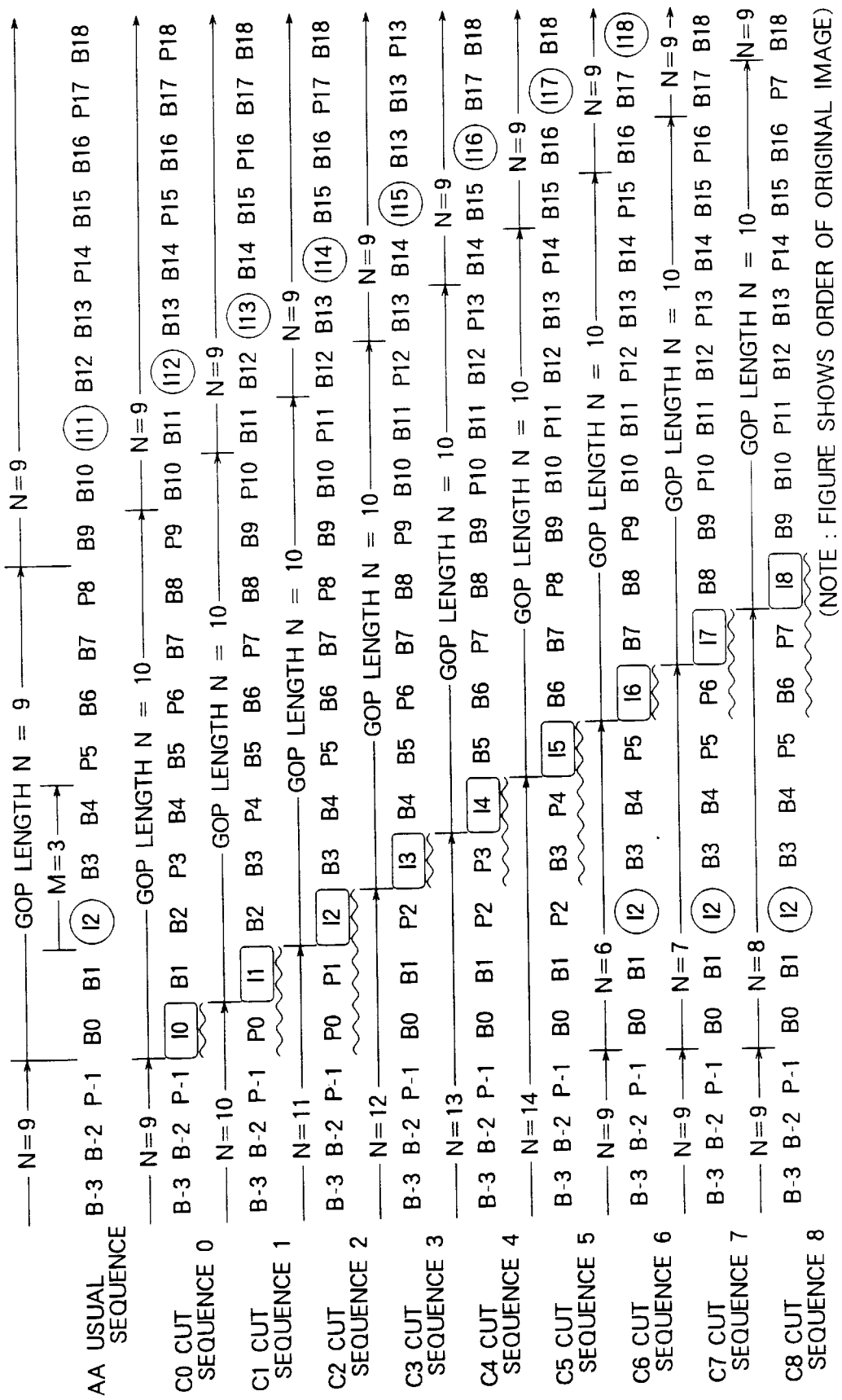
FIG. 14 is a diagram illustrating an encoding sequence of the embodiment of the present invention.

FIG. 14 is a diagram illustrating the encode sequence of the embodiment of the present invention.

In the MPEG standard, the number of the pictures in a GOP is represented by N and the cycle of the I-pictures or P-pictures (number of pictures from one I-picture to the next picture) is represented by M.

In the MPEG standard, there is no limitation placed on these N and M, but here, for the purpose of explanation, in the usual sequence AA, the number of pictures N is set to 9 and the picture cycle M is set to 3.

In FIG. 14, the I-pictures surrounded by the squares indicate the starts of sequences having a cut, and the I-pictures surrounded by the circles indicate the starts of other general GOP'S.

Note that, FIG. 14 only shows the order of the encode sequence of pictures in an original image. In the figure, the numbers appended to the letters I, P, and B show what "number" the picture is in the original image. That is, it should be noted that these numbers do not show the order of the pictures in the encoder output of the GOP concept (for the order of the pictures, refer to for example FIG. 1). In the encoder output, the order of the B-pictures is switched as explained by referring to for example FIG. 1. When viewed in units of GOP's, an I-picture is always at the start.

When the number of pictures N is 9, there are nine types of cut sequences, that is, the cut sequence 0 (C0) to the cut sequence 8 (C8), depending on the position of the cut. In each of these cases, however, in the present invention, as explained above by referring to FIG. 12, the biggest characteristic feature is that the type of picture immediately before the I-picture at the start of a sequence having a cut (shown surrounded by a square) is always a P-picture.

The different sequences will be explained below:

Cut Sequence 0 (C0)

The position of the I-picture is shifted two places to the front compared with the usual sequence, so the "0-th" picture of the GOP becomes an I-picture (I0). However, since the picture of the GOP immediately before this is a P-picture (P-1), the GOP starts from the I0-picture. Due to the sequence itself, the number of pictures N up to the P9-picture of the GOP thereof becomes 10. The subsequent GOP consists of the usual sequence.

Cut Sequence 1 (C1)

The position of the I-picture is shifted one place to the front in comparison with the usual sequence, so the "first" picture of the GOP having the cut becomes the I-picture (I1). The "0-th" picture immediately before this is usually a B-picture but is made a P-picture (P0) here. This GOP starts from the I1-picture. Due to the sequence itself, the number of pictures N up to the P10-picture becomes 10. The subsequent GOP consists of the usual sequence. Note that since the GOP immediately before this contains up to the P0-picture, the number of pictures N becomes 10 in just that case.

Cut Sequence 2 (C2)

The position of the I-picture is the same as the position of the usual sequence, so the "second" picture became the I-picture (I2), but the "0-th" and "first" pictures immediately before this are both made P-pictures (P0 and P1) even though they are usually B-pictures. This GOP having a cut starts from the I2-picture. Due to the sequence itself, the number of pictures N up to the P11-picture becomes 10. The subsequent GOP consists of the usual sequence. Note that since the GOP immediately before this contains up to the P0-picture and P1-picture, the number of pictures N becomes 11 in just that case.

Cut Sequence 3 (C3)

The position of the I-picture is shifted one place to the rear in comparison with the usual sequence, so the "third" picture becomes an I-picture (I3). The usual sequence continues up to the "second" picture, however. This GOP having a cut starts from I3-picture. Due to the sequence itself, the number of pictures N up to the P12-picture becomes 10. The subsequent GOP consists of the usual sequence. Note that since the GOP immediately before this contains up to the B0-picture, B1-picture, and P2-picture, the number of pictures N becomes 12 in just that case.

Cut Sequence 4 (C4)

The position of the I-picture is shifted two places to the rear in comparison with the usual sequence, so the "fourth" picture becomes an I-picture (I4). The usual sequence continues up to the "second" picture, however, and the "third" picture immediately before the I4-picture is a P-picture (3). This GOP having a cut starts from the I4-picture. Due to the sequence itself, the number of pictures N up to the P13-picture becomes 10. The subsequent GOP consists of the usual sequence. Note that since the GOP immediately before this contains up to the B0-picture, B1-picture, P2-picture, and P3-picture, the number of pictures N becomes 13 in just that case.

Cut Sequence 5 (C5)

The position of the I-picture is shifted three places to the rear in comparison with the usual sequence, so the "fifth" picture becomes an I-picture (I5). The usual sequence continues up to the "second" picture, however, and the "third" picture among the two pictures immediately before the I5-picture is made a B-picture (B3) and the "fourth" picture is made a P-picture (P4). This GOP having a cut starts from I5-picture. Due to the sequence itself, the number of pictures N up to the P14-picture becomes 10. The subsequent GOP consists of the usual sequence. Note that since the GOP immediately before this contains up to the B0-picture, B1-picture, P2-picture, B3-picture, and P4-picture, the number of pictures N becomes 14 in just that case.

Cut Sequence 6 (C6)

If the position of the I-picture were to be shifted to the rear like with the cut sequences 0 to 5, the length (number of pictures N) of the GOP immediately before this would become too long, so in this cut sequence, as rule separate from the above, a slightly short usual sequence is placed first and then a sequence having a cut is placed.

The usual sequence starting from the B0-picture is stopped at a number of pictures N of 6, that is, at the P5-picture. The "sixth" picture after this is made the I-picture (I6) of the sequence having a cut. This GOP having a cut starts from I6-picture. Due to the sequence itself, the number of pictures N up to the P15-picture becomes 10. The subsequent GOP consists of the usual sequence.

Cut Sequence 7 (C7)

In the same way as the cut sequence 6 (C6), if the position of the I-picture were simply shifted to the rear, the length (number of pictures N) of the GOP immediately before this would become too long. There, as a separate rule, a slightly short usual sequence is placed first and then a sequence having a cut is placed.

The usual sequence starting from the B0-picture is continued up to the P5-picture and a P-picture (P6) is placed at the "sixth" picture after this. The sequence of the GOP is stopped here at a number of pictures N of 7. The "seventh" picture of the GOP immediately after this is made an I-picture (I7) of the sequence having a cut.

This GOP having a cut starts from the I7-picture. Due to the sequence itself, the number of pictures N up to the P16-picture becomes 10. The subsequent GOP consists of the usual sequence.

Cut Sequence 8 (C8)

In the same way as the cut sequence 7 (C7), if the position of the I-picture were simply shifted to the rear, the length (number of pictures N) of the GOP immediately before this would become too long. There, as a separate rule, a slightly short usual sequence is placed first and then a sequence having a cut is placed.

The usual sequence starting from the B0-picture is continued up to the P5-picture, a B-picture (B6) is placed at the "sixth" picture after this and a P-picture (P7) is placed at the "seventh" picture. The sequence of the GOP is stopped here at a number of pictures N of 8. The "eight" picture of the GOP immediately after this is made an I-picture (I8) of the sequence having a cut. This GOP having a cut starts from the I8-picture. Due to the sequence itself, the number of pictures N up to the P17-picture becomes 10. The subsequent GOP consists of the usual sequence.

This will be explained again by referring to FIG. 13.

The cut decision circuit 169 learns based on the information input to the EDL reading unit 167 and the information added and changed by the manual editing point correction device 168 at what time code frame the cut should be placed, therefore can easily find which of the cut sequences explained above should be selected in the vicinity of the cut.

The cut decision circuit 169 simply repeatedly gives the encode sequence instruction information 171 to the video encoder 176 in the order of the usual sequence AA in the usual parts without a cut. In the vicinity of a cut, it gives a pattern compatible with one of the cut sequence 0 (C0) to the cut sequence 8 (C8) to the video encoder 176.

An explanation will be made next of the amount of delay of the image delaying device 174.

To simplify the configuration of the video encoder 176, the video encoder 176, unless specially instructed to the contrary, always performs the encoding by the rule that two B-pictures should always follow if an I-picture or a P-picture is instructed or that an I-picture or a P-picture should always be placed if two B-pictures continue (that is, a cycle M of the I-pictures or the P-pictures of 3). In other words, the video encoder 176 can be said to expect this simple rule. However, it is assumed that the video encoder 176 can perform the encoding of a sequence designated in advance as designated.

When desiring to perform encoding other than this basic usual sequence, since it is sufficient to know in advance that the encoding is to be different from the usual one, the video encoder 176 requires the undelayed time code 170 and the encode instruction information 171.

For the amount of delay 178, here refer to FIG. 14 and take note of the wavy lines. The wavy lines show the parts to which the simple rule of the usual sequence, that is, the rule that "two B-pictures should always follow if an I-picture or a P-picture is instructed or an I-picture or a P-picture should always be placed if two B-pictures continue" is not to be applied.

As is clear from FIG. 14, the effect of this irregular rule based on placing a cut is that when the cycle M of the I-pictures or the P-pictures is 3, since there are three frames worth of pictures at the maximum, it is sufficient to set the amount of delay 178 of the image delaying device 174 to 3 frames. The amount of delay 178 is simultaneously input to the video encoder 176, therefore as a result the video encoder 176 can determine at one preceding frame specifically from which picture it should perform special encoding when it must perform encoding by a sequence different from usual (case where the cycle M is not equal to 3) from the delayed video signal 175 with the known amount of delay 178, the time code 170 without a delay, and the encode instruction information 171

The example explained by referring to FIG. 14, in order to facilitate the explanation, was explained with reference to the case where the number of pictures N of the usual sequence was 9 and the picture cycle M was 3, but if the number of pictures N and cycle M are changed, for example, when the number of pictures N and the cycle M become larger, the number of the cut sequences explained by referring to FIG. 14 is increased as well. Along with this, the amount of delay indicated by the wavy lines in FIG. 14 becomes larger.

As explained above, as shown in FIG. 12, basically, even if there is a change of the pictures accompanying the editing of the pictures, no use is made of a "closed GOP" or "broken Link" provided in the GOP header. The concept of a cut based on the EDL is used, an I-picture is placed at the start of the GOP of the part having a cut, and the GOP before this and the GOP having a cut are made independent, whereby the characteristic of the MPEG standard is maintained even by the editing of the pictures and a coding result not causing a reduction in the image quality is obtained.

Particularly, by preparing a cut sequence of the type based on the number of pictures N and cycle M in the usual sequence and, when the number of pictures N becomes very large, limiting the number of the pictures of the GOP having a cut, setting the amount of delay of the signal processing in accordance with the cut sequence, and arranging the pictures so that an I-picture is located at the start of the GOP having a cut, it becomes possible to maintain the independence of the GOP's possible even if there is a cut and perform coding processing utilizing the characteristics of the MPEG standards.

Effect of the Embodiment

As a result, according to the embodiment of the present invention, even if the video which has been encoded by the MPEG standard is edited after encoding, there is no influence on the image quality. In other words, the editing work can be freely carried out without a reduction of the image quality even for a band-compressed and coded picture which was coded by the MPEG standard. In this case, there is no difference in the amount of bits generated for obtaining a similar image quality in comparison with the coding by the usual MPEG standard.

As explained above, no use is made of the "broken link flag" and "closed GOP flag" necessary for the editing of an MPEG video, therefore it is not necessary to use the GOP header which is treated as optional in the MPEG standard.

Although there is a limitation that the editing be carried out at predetermined locations which are determined by the EDL, due to the existence of the advantages explained above, for example, even when one becomes aware of the existence of a problem in the image quality of a certain "cut sequence" at the point of time when the coding processing of all of the program is ended, it is possible to perform re-coding processing for only the "cut sequence" by re-adjusting the bit rate or the like and to perform editing to change the pictures. If the present invention were not used, even when it was desired to change only that part, the editing would have to be done all over again from the start of the program or use had to be made of a "broken link flag" or "closed GOP" despite the deterioration of the image quality. However, if this were done, the contradictory result would occur that the editing which was performed so as to improve the image quality would cause the quality of the images before and after this to deteriorate.

The above-mentioned cut can be made based on the editing decision list (EDL) prepared in the above editing process and also be otherwise freely made, for example, can be made periodically, can be made in accordance with the situation of the video scenes, and can be freely made manually by the user.

Other Embodiment

The above embodiment was explained with reference to the editing of pictures in the case of encoding mainly the video data of a DVD, but the present invention is not limited to the editing of such pictures and can be similarly applied to a case where the image data is partially changed and corrected in the image data transmission in a VOD service. The effect thereof is similar to the effect in the above editing.

In the above embodiment, the MPEG standard was illustrated as the case where high efficiency compression and coding were carried out for a motion picture, but the present invention is not limited to the use of the MPEG standard. For example, in the encoder shown in FIG. 2, FIG. 7, and FIG. 8, an example using DCT for the band compression of the image data was shown, but as the band compression, it is sufficient so far as an orthogonal transformation is carried out. The orthogonal transformation is not limited to the DCT. Any suitable orthogonal transformation can be carried out in accordance with other image data to be coded, for example, a Hadamar transformation. Of course, the same is also true for the IDCT.

According to the present invention, even if there is a change of the pictures in a GOP etc., the coding can be carried out without referring to the pictures of the preceding GOP and without a reduction of the image quality. Particularly, in the present invention, the editing and change of the coded image data can be carried out without lowering the image quality.

Further, according to the present invention, the incomplete independence of GOP's in the GOP's heretofore is overcome and the signal processing can be carried out without the use of a "closed GOP", "broken link", and so on. Accordingly, according to the present invention, the GOP header does not have to be used and it becomes possible to place pictures in the GOP header part.

What is claimed is:

1. An image data processing method in a signal processing method for coding a picture sequence comprised of I-pictures, P-pictures, and B-pictures accommodated in GOP's, wherein when previously encoded pictures of a certain GOP among a series of GOP's are changed in accordance with an editing operation, the coding is performed replacing the first coded picture of the changed picture sequence of the GOP with an I-picture of a picture number prescribed in accordance with the position of change so that coding is possible without the existence of a picture in the preceding GOP.

2. An image data processing method as set forth in claim 1, further comprising the step of:

setting the pictures of the cut GOP so that two B-pictures always follow when an I-picture or a P-picture is indicated or so that an I-picture or a P-picture is always placed if two B-pictures continue.

3. An image data processing method as set forth in claim 1, wherein said coding performed by replacing the first picture of the changed picture sequence operates to produce said changed picture sequence with a longer GOP length than an immediately succeeding group of pictures.

4. An image data processing method in a signal processing method for coding a picture sequence for each of a series of GOP's comprised of I-pictures, P-pictures, and B-pictures accommodated in GOP's by using the MPEG standard, comprising the steps of:

making cuts at predetermined positions for changing the pictures of the GOP's;

preparing for all cut positions all the cut sequences defining the number of pictures N and the number of the first I-picture of the cut GOP, defined by the number of pictures and the picture cycle in the GOP's of the usual sequence, and the pictures of the GOP's before the cut sequences when pictures are changed at the cut positions in the GOP's;

reading out a corresponding cut sequence when a cut is made at a certain position and setting the first I-picture and the number of pictures of the GOP of the cut, the number of pictures of the GOP before the cut, and the picture preceding the new I-picture of the cut;

rearranging the pictures in accordance with the set pictures and number of pictures to compose the GOP; and coding the composed picture sequence.

5. An image data processing method in a signal processing method for coding a picture sequence comprised of I-pictures, P-pictures, and B-pictures accommodated in GOP's, wherein when the pictures of a certain GOP among a series of GOP's are changed by making cuts at predetermined positions, the coding is performed replacing the first picture of the changed picture sequence of the GOP with an I-picture of a picture number prescribed in accordance with the position of change so that coding is possible without the existence of a picture in the preceding GOP, said image data processing method further comprising the steps of:

setting amounts of delay of the image data in advance in accordance with the cut positions and performing the coding by imposing a delay in accordance with the amount of delay associated with the cut position, to a composed picture sequence.

6. An image data processing apparatus comprising:

a means for providing image data for each of a series of GOP's comprised of I-pictures, P-pictures, and B-pictures accommodated in GOP's, a cut sequence preparing means for preparing for all cut positions all the cut sequences defining the number of pictures N and the number of the first I-picture of the cut GOP, defined by the number of pictures and the picture cycle in the GOP's of the usual sequence, the pictures of the GOP's before the cut sequences, and a delay amount when pictures are changed at the cut positions in the GOP's;

a cut processing means for reading out a corresponding cut sequence when a cut is made at a certain position of image data provided from said image data providing means and setting the first I-picture and the number of pictures of the GOP of the cut, the number of pictures of the GOP before the cut, and the picture preceding the new I-picture of the cut and rearranging the pictures in accordance with the set pictures and number of pictures to compose the GOP;

a means for delaying the image data output from the image data providing means in accordance with the amount of delay; and a coding means for coding the picture sequence of the GOP which was rearranged and the delayed image data based on the MPEG standard.

* * * * *